(12) United States Patent
Medard et al.

(10) Patent No.: US 9,160,440 B1
(45) Date of Patent: Oct. 13, 2015

(54) METHOD FOR CODING-BASED, DELAY-EFFICIENT DATA TRANSMISSION

(75) Inventors: Muriel Medard, Cambridge, MA (US);
Atilla Eryilmaz, Cambridge, MA (US);
Asuman Ozdaglar, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 1652 days.

(21) Appl. No.: 11/756,191

(22) Filed: May 31, 2007

Related U.S. Application Data (60) Provisional application No. 60/810,328, filed on Jun. 2, 2006.

(51) Int. Cl.
*H04J 1/00* (2006.01)
*H04B 7/155* (2006.01)
*H04L 1/00* (2006.01)

(52) U.S. Cl.
CPC .......... *H04B 7/15521* (2013.01); *H04L 1/0076* (2013.01)

(58) Field of Classification Search
CPC ... H04L 1/0075; H04L 1/0076; H04L 1/0077; H04L 45/00; H04L 2001/0093; H04B 7/15521; H04B 7/0456
USPC ................ 370/336–338, 315–328, 342–350, 370/442–444; 455/450–452.2
See application file for complete search history.

(56) References Cited

U.S. PATENT DOCUMENTS

| | | | |
|---|---|---|---|
| 2005/0078631 A1* | 4/2005 | Cornwall | 370/330 |
| 2005/0152391 A1* | 7/2005 | Effros et al. | 370/432 |
| 2006/0224760 A1* | 10/2006 | Yu et al. | 709/231 |
| 2006/0251062 A1* | 11/2006 | Jain et al. | 370/389 |
| 2007/0274324 A1* | 11/2007 | Wu et al. | 370/400 |
| 2008/0291834 A1* | 11/2008 | Chou et al. | 370/238 |

* cited by examiner

*Primary Examiner* — George Eng
*Assistant Examiner* — Marcus Hammonds
(74) *Attorney, Agent, or Firm* — Anderson Gorecki & Rouille LLP (57) ABSTRACT

A method, apparatus and computer program product for -based, delay-efficient data transmission for broadcasting a single file is presented. A file (f) comprised of K packets to be broadcast to a plurality of receivers is determined. A plurality of packets ($P_k$) of the file are selected for transmission during a timeslot (t). Next, a linear combination of the selected packets (P[t]) are produced, the linear combination of packets are selected at random within the file. The linear combination of selected packets is then transmitted to a plurality of receivers over unreliable channels.

14 Claims, 8 Drawing Sheets

METHOD FOR CODING-BASED, DELAY-EFFICIENT DATA TRANSMISSION

CROSS REFERENCE TO RELATED APPLICATIONS

The present application claims the benefit of U.S. Provisional Patent Application No. 60/810,328, filed on Jun. 2, 2006, which is incorporated herein by reference in its entirety.

GOVERNMENT RIGHTS

This invention was made with government support under grant number N00014-05-1-0197 awarded by the Navy and grant number ANI0121662 awarded by the National Science Foundation. The government has certain rights in this invention.

BACKGROUND

Network coding (sometimes referred to simply as "coding") is a new research area that may have interesting applications in practical networking systems. With network coding, intermediate nodes, instead of only forwarding the incoming packets, may send out packets that are linear combinations of previously received information. There are two main benefits of this approach: potential throughput improvements and a high degree of robustness.

Communication networks today share the same fundamental principle of operation. Whether it is packets over the Internet, or signals in a phone network, information is transported in the same way as cars share a highway. That is, independent data streams may share network resources, but the information itself is separate. Routing, data storage, error control, and generally all network functions are based on this assumption.

Network coding breaks this assumption. Instead of simply forwarding data, nodes may recombine several input packets into one or several output packets. Linear network coding uses a linear combination of the data, interpreted as numbers over some finite field. This allows for a much larger degree of flexibility in the way packets can be combined. Network coding is very well suited for environments where only partial or uncertain information is available for decision making. Successful reception of information does not depend on receiving specific packet content but rather on receiving a sufficient number of independent packets.

Linear combining requires enhanced computational capabilities at the nodes of the network. However, according to Moore's law, processing is becoming less and less expensive. The bottleneck has shifted to network bandwidth to support the ever-growing demand in applications and QoS guarantees over large unreliable networks. Network coding utilizes cheap computational power to increase network efficacy.

With the introduction of third-generation cellular systems over the last decade, there has been both a significant increase in the capacity of wireless networks and a growing use of wireless communication for data transmission. An essential feature of the newly emerging wireless networks is the transmission of files to multiple (potentially heterogeneous) receivers, as exemplified by transmission of video or music files. While the most common approach to data transmission builds on the scheduling/routing approach, where information is transmitted to one of multiple receivers as a function of their channel conditions, it has also been recognized that broadcasting to multiple receivers using network coding may be more efficient for utilizing the capacity of the network.

Although these throughput gains may appear to imply gains in delay through Little's law, this is not the case since coding is performed over large blocks and each packet in the block must await the completion of the whole block before it can be decoded. Despite considerable practical interest in the use of network coding in wireless communication systems, gains in delay performance resulting from network coding relative to traditional scheduling have not been analyzed or quantified. The best setting to investigate such gains is the rateless transmission scenario, where data of fixed length is to be communicated over the channel. In this context, the comparison in delay performance between traditional schemes and network coding is performed through the completion times of the whole data.

SUMMARY

Conventional network transmission mechanisms such as those explained above suffer from a variety of deficiencies. One such deficiency is that networks can become the bottleneck for network transmissions, especially in the case where data is being transmitted to multiple receivers over unreliable channels.

Embodiments of the invention significantly overcome such deficiencies and provide mechanisms and techniques that provide coding-based, delay-efficient data transmission.

As well as the already well-understood capacity gains, network coding leads to significant improvement in delay performance both with and without channel side information (CSI). This is potentially important, since depending on the application, delay performance may be critical to the satisfaction of the users. Equivalently, with network coding more users can be supported with the same delay performance of scheduling.

Both in the presence and absence of CSI, network coding achieves optimal performance when coding is performed for files destined for the same set of receivers, but no coding is performed across files with separate destinations. Although Network Coding provides significant delay gains in both cases, they are emphasized in the absence of CSI. This last point of significant delay gains is particularly interesting given that network coding does not provide any capacity gains for the single hop unicast scenario.

In a particular embodiment of a method of coding-based, delay-efficient data transmission for broadcasting a single file, the method includes determining a file (f) comprised of K packets to be broadcast to a plurality of receivers. A plurality of packets ($P_k$) of the file are selected for transmission during a timeslot (t). Next, a linear combination of the selected packets (P[t]) are produced, the linear combination of packets are selected at random within the file. The linear combination of selected packets is then transmitted to a plurality of receivers over unreliable channels.

In another particular embodiment of a method of coding-based, delay-efficient data transmission for multiple unicast transmissions, the method includes defining a set of coding classes (Class j) that partition a set of files ($\mathcal{F}$) into J subsets. A set of files $C_j$ within Class-j are defined. A plurality of packets ($P_k$) of a plurality of files having a same class for transmission during a timeslot (t) are selected. A linear combination of said selected packets (P[t]) are provided, the linear combination of packets selected at random within the plurality of files having a same class. The linear combination of selected packets are then transmitted to a plurality of receivers.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing coding-based, delay-efficient data transmission as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Gains in delay performance are achieved from utilizing network coding. We consider a model of file transmission to multiple receivers from a single base station. Using this model, gains in delay performance from network coding with or without channel side information can be substantial compared to conventional scheduling methods for downlink transmission.

Figure 1:
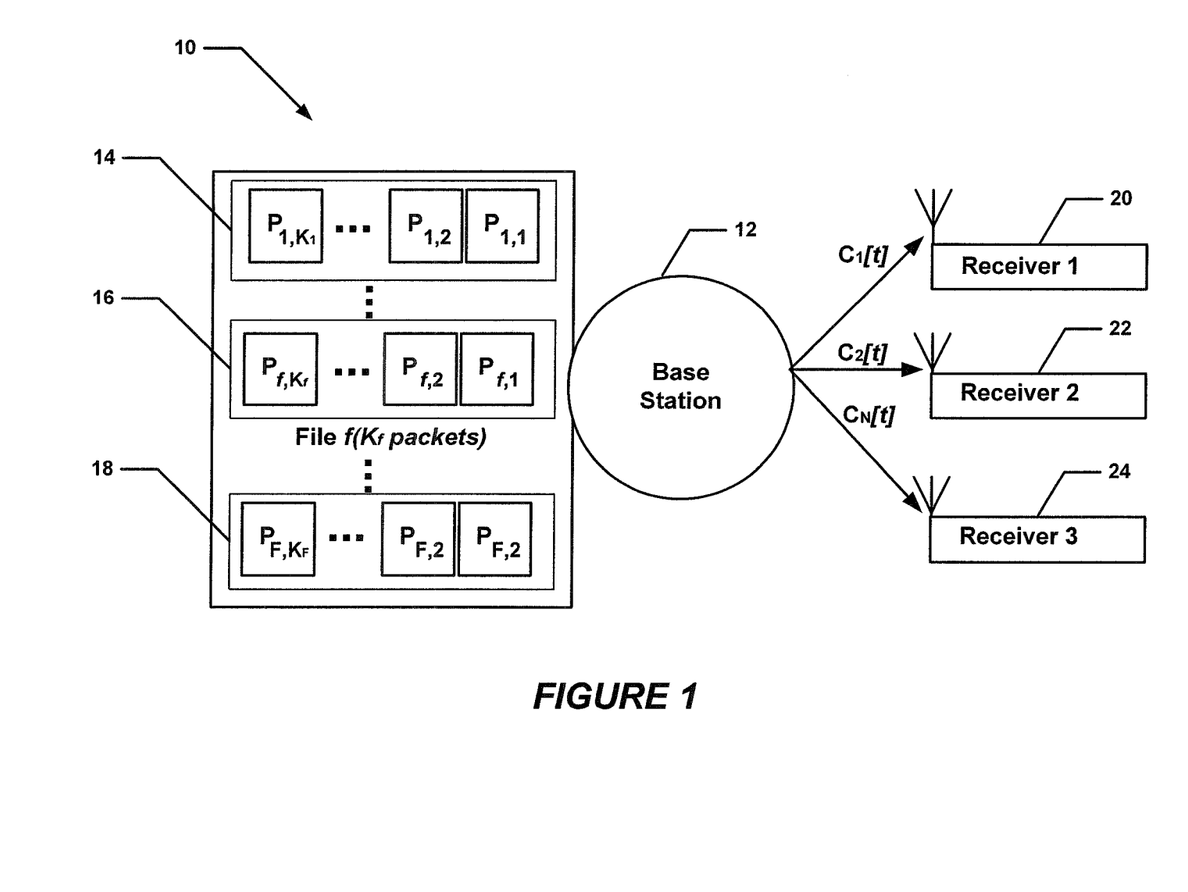
FIG. 1 depicts a block diagram of a system performing coding-based, delay-efficient data transmission in accordance with embodiments of the invention.

Consider the cellular downlink scenario shown in the system model 10 of FIG. 1, where the base station holds a set of files (14, 16 and 18), F. The set of receivers (20, 22, and 24) is denoted by N. File f$\in F$ is demanded by the set $N_f \subseteq N$ of receivers. The minimum average time required to complete the download of all the files by all the interested receivers is of interest, where the transmissions have to be done over time varying channels. This can be achieved with and without the availability of CSI at the base station and with and without the possibility of linear coding in the manner described below.

A given file f$\in F$ is composed of $K_f$ packets, where Packet-k of file f is referred to as $P_{f,k}$, which is a vector of length m over a finite field $F_q$. It is assumed that transmissions occur in time slots, each of which is of duration just long enough to accommodate a single packet transmission. The channel between the base station and the $i^{th}$ receiver is a randomly varying ON/OFF channel. We let $C_i[t] \in \{0,1\}$ denote the state of user i's channel in slot t. It is also assumed that Receiver-i successfully receives the packet transmitted at slot t if $C_i[t]=1$, and it cannot receive anything if $C_i[t]=0$. Each $C_i[t]$ is taken to be a Bernoulli random variable with mean $c_i$ that are independent across time and across receivers. The channels of different receivers can in general be asymmetric. However, in parts of the subsequent analysis attention is restricted to symmetric cases in order to have tractable formulations. The presence of CSI implies that the channel state vector, C [t], is known at the transmitter at the beginning of slot t.

Let P[t] denote the packet chosen for transmission in slot t. If the base station is not allowed to code, then at any given slot it must transmit a single packet from one of the files. Thus, giving $$P[t] \in \{P_{f,k}\}_{\{f \in F\}}^{\{k=1,\ldots,K_f\}}.$$

This is the typical mode of transmission considered in literature. This mode is referred to as the Scheduling Mode (or simply Scheduling).

If coding is allowed, then in a slot, say t, any linear combination of the packets can be transmitted. Specifically, $$P[t] = \sum_{f \in F} \sum_{k=1}^{K_f} a_{f,k}[t] P_{k,f}$$

where $a_{f,k}[t] \in Fq$ for each f$\in F$ and k$\in\{1, \ldots, K_f\}$. The transmitter chooses the coefficients $\{a_{f,k}[t]\}$ at every time slot t. This mode of transmission will be referred to as the Coding Mode (or simply coding) henceforth.

Given the above model, of interest is minimizing the amount of time necessary for all the files to be transmitted to all the interested receivers. This metric is referred to as the completion time.

In this section, described is the transmission of a single file to all the receivers. Since $|F|=1$, the subscript f will be dropped in the notation, and Packet-k will be denoted as $P_k$ and the size of the file as K. The minimum mean completion time of the file using coding is of interest, as well as the asymptotic optimality of coding over all possible strategies. Then, the optimal scheduling strategy will be categorized with and without CSI.

It has been shown in the literature that linear coding is sufficient to achieve the maximum achievable rate for multicast networks. Noticing that the broadcast scenario is a special instance of a multicast transmission, consider the set of policies where the transmitted packet in slot t is given by $$P[t] = \sum_{k=1}^{K} a_k[t] P_k \text{ with } a_k[t] \in F_q \text{ for each } k \in \{1, \ldots, K\}$$

The following randomized strategy is considered.

---
RANDOMIZED BROADCAST CODING (RBC):

While (File is incomplete)
  Pick $a_k[t]$ uniformly at random from $\mathbb{F}_q$ for each k;

Transmit $P[t] = \sum_{k=1}^{K} a_k[t] P_k,$ ;

$t \leftarrow t+1$.

---

Each receiver keeps the incoming packets that it could receive and then decodes all the packets $\{P_k\}_{\{k=1,\ldots,K\}}$ as soon as K linearly independent combinations of the packets are collected. Random linear coding arguments imply that the expected number of slots before K linearly independent combinations can be collected with RBC is given by $$\sum_{k=1}^{K} \frac{1}{(1-(1/q)^k)}$$

This expression can be upper-bounded by $K_{q/(q-1)}$, which in turn can be made close to K even with reasonably low values of q. Thus, for all practical purposes, for a large enough field size q, it is sufficient for each receiver to be active K slots on average before it can decode the whole file. Notice that information theoretically it is impossible to send the file with less than K transmissions, and so RBC asymptotically (in q) achieves the best possible performance over all strategies.

Another important issue is the overhead related with this mode of transmission. Coding requires [K log$_2$ q] bits of overhead to contain the coefficients of the associated linear combination, whereas the packet size is [m log$_2$ q] bits. Thus, for m >> K, the overhead is negligible.

RBC is not only easy to implement, but also requires no knowledge of the channel state vector, and asymptotically achieves the smallest mean completion time over all policies. The optimal scheduling policy is much more difficult to characterize, even for the symmetric channel conditions.

Next, the mean completion time expression for RBC is found. The random variable $Y_i$ is defined as the number of slots before Receiver-i's channel is ON K times, for I= 1, . . . , N. Then, the mean completion time is equal to $$\mathbb{E}\left[\max_{i \in \{1,\ldots,N\}} Y_i\right]$$

Let $T_1$ denote the completion time of the optimal coding policy given above. Then, $$\mathbb{E}[T_1] = K + \sum_{i=1}^{\infty}\left[1 - \prod_{i=1}^{N}\left(\sum_{\tau=K}^{t}\binom{\tau-1}{K-1}\overline{c}_i^{(\tau-K)} c_i^K\right)\right]$$

where $$\binom{n}{m}$$

gives the number of combinations of size m of n elements, and $\vec{c}_i \triangleq (1-c_i)$.

In scheduling mode, unlike in the coding mode, the presence or lack of CSI affects the performance. Hence, these two cases will be discussed separately. Throughout, symmetric channels for tractability are assumed.

Scheduling without CSI will now be discussed. To minimize the load of uplink transmission which is typically the bottleneck in cellular systems, it is assumed that the transmitter receives feedback from each receiver only at the time when it has just received the whole file. Notice that in this case, all packets have equal priority. Also, since the channels are independent and identically distributed (i.i.d.) over time and users, one of the optimal scheduling policies is Round Robin (RR), where Packet-k is transmitted in time slots (mK+ k) for m=0, 1, . . . until all the receivers get the file.

To compute the mean completion time of the above RR scheduler, $X_k^i$ is defined to be the number of transmissions of $P_k$ before it is received by Receiver-i. Then, $$Y^i \triangleq \max_{k \in \{1,\ldots,K\}} \{KX_k^i + k\}$$

gives the time slot when Receiver-i receives the whole file. Finally, $$T_2 \triangleq \max_{i \in \{1,\ldots,N\}} Y^i$$

gives the completion time of the algorithm. Its mean is described below.

Under symmetric channel conditions (i.e., $c_i = c \in (0,1)$ for all I), $$\frac{\mathbb{E}[T_2]}{K} = \gamma + \sum_{i=1}^{\infty}\left[1 - (1-(1-c)^t)^{KN}\right]$$

for some $$\gamma \in (1/2, 1)$$

The upper bound of 1 for γ is due to the fact that k≥K. The lower bound of ½ follows from stochastic coupling arguments and heavily relies on the symmetry of the channel distributions. In particular, consider a sample path of the channel state process, $\omega \triangleq (C[1], C[2], \ldots)$. i(ω) is used to denote the receiver that was the last to complete the file, and k(ω) to denote the index number of the last packet that Receiver-i(ω) received. The earlier notation, Y(ω) gives the completion time of the file at Receiver-i(ω) under the given sample path. Also, notice that Y(ω)=∈{1, . . . , ⌊K/2⌋}, another sample path z, 905 is constructed that has the same probability of occurrence as ω, but leads to $$Y(\tilde{\omega}) = X_{k(\omega)}^{i(\omega)}(\omega')K + (K' - k(\omega)),$$

This implies that $$\mathbb{E}[Y] \geq \frac{(K+1)}{2} + K\mathbb{E}\left[\max_{i,k} X_k^i\right], \quad (1)$$

The construction of $$\tilde{\omega} = (\tilde{C}[1], \tilde{C}[2], \ldots)$$

follows the following rule $$\tilde{C}_j[rK+l] = \begin{cases} C_j[rK+(K-l)], & \text{if } r = X_{k(\omega)}^{i(\omega)}(\omega), \\ & j = i(\omega), l \in \{k(\omega), K-k(\omega)\}, \\ C_j[rK+l], & \text{otherwise.} \end{cases}$$

It is easy to see that under symmetric conditions this sample path has the properties listed above.

Next, it is desirable to find the second term in (1). Due to i.i.d. assumptions, $X_k^i$ are also i.i.d. with distribution $P(X_k^i = m) = (1-c)^{m-1}c$, $m=1, 2, \ldots$. Since this distribution is independent of $i$ and $k$, we can compute $$\mathbb{E}\left[\max_{i,k} X_k^i\right] = \sum_{t=1}^{\infty} \left[1 - (1-(1-c)^t)^{KN}\right]. \quad (2)$$

The proof is complete once (2) is substituted into (1).

Before characterizing the optimal scheduling rule with CSI, the suboptimality of scheduling compared to coding will be shown with the following example.

Consider the case of K=3 and N=3, i.e. three packets are to be broadcast to three receivers. Consider the channel realizations C[1]=(0,1,1), C[2]=(1,0,1), C[3]=(1,1,0), and C[4]=(1,1,1). Thus, in the first four slots, each receiver can hear the transmission three times. The optimal scheduling rule would transmit $P_1, P_2, P_3$ in the first three slots, leaving Receiver-i in demand for Packet-i in the fourth slot. Clearly, no scheduling rule can ever complete the file download at all three receivers in the fourth slot. With coding, on the other hand, the following transmissions will complete the transmissions; $(P_1+P_2)$, $(P_2+P_3)$, $(P_1+P_3)$, $(P_1+P_2+P_3)$ (see Table 1). It is not difficult to see that coding will never require more slots than is necessary for scheduling for all other realizations. Hence, strictly better completion times are achieved with coding.

TABLE 1

|  | t = 1 | t = 2 | t = 3 | t = 4 |
|---|---|---|---|---|
| $R_1$ | — | $P_2\|(P_2+P_3)$ | $P_3\|(P_1+P_3)$ | $?\|(P_1+P_2+P_3)$ |
| $R_2$ | $P_1\|(P_1+P_2)$ | — | $P_3\|(P_1+P_3)$ | $?\|(P_1+P_2+P_3)$ |
| $R_3$ | $P_1\|(P_1+P_2)$ | $P_2\|(P_2+P_3)$ | — | $?\|(P_1+P_2+P_3)$ |

Demonstration of Example 1: Ri corresponds to Receiver-i, '−' denotes OFF channel states, and the entry a|b gives the optimal transmissions with scheduling and coding, respectively. With scheduling, no choice of $\{P_j\}$ in slot 4 can complete the file at all the receivers for the given channel realization.

Dynamic Programming is used to find the characterization of the optimal scheduling policy for symmetric channel conditions, i.e. $c_i = c$ for all $i \in \{1, \ldots, N\}$. Given C[t], the scheduler can choose any one of the packets $\{P_1 \ldots, P_K\}$ for transmission. A little thought reveals the need of memory about the previous receptions at each of the receivers. For this purpose, $M_{i,k}[t]$ is defined to be the memory bit associated with Packet-k and Receiver-i. In particular, $M_{i,k}[t]=1$ (or 0) implies that Receiver-i has not received (or has received) Packet-k- in the slots $1, \ldots, t-1$. Moreover, M[t] is used to denote the matrix of memory bits $$[M_{i,k}[t]]_{i=1,\ldots,N}^{k=1,\ldots,K}.$$

Let $\pi$ denote the set of feasible stationary policies that can be implemented by the base station. Each policy it $\pi \epsilon \pi$ defines a mapping from the pair (M[t], C[t]) to the set $(1, \ldots, K)$ describing the packet to be sent at time t. Note that the policy is stationary in the sense that it is only a function of the matrix and channel conditions at the time. The i.i.d. nature of the arrivals and departures imply that this is the optimal policy among all policies, including those that are time dependent.

To characterize the optimal policy, let $$J^\pi(\mathbb{M},C) = \mathbb{E}_{[\#}\mathbb{E}_{[\#}$$

slots to reach θ with policy $$\pi | \mathbb{M}_{[0]} = \mathbb{M}, C/0] = C],$$

where θ denotes the zero matrix. Then, $$J^*(\mathbb{M}, C) \triangleq \min_{\pi \in \Pi} J^\pi(\mathbb{M}, C)$$

is the minimum completion time of the optimal algorithm if it starts from M and the first channel is C. Also, $$\pi^*(\mathbb{M}, C) \triangleq \operatorname*{argmin}_{\pi \in \Pi} J^\pi(\mathbb{M}, C)$$

gives the optimal policy.

Observe that once $J^*(\mathbb{M}, C)$ is solved for all C, $$J^*(\mathbb{M}) \triangleq \mathbb{E}_C[J^*(\mathbb{M},C)],$$

is computed, where the expectation is over the channel realizations. Thus, $J^*(M)$ denotes the mean completion time of the optimal algorithm starting from M, Hence, of interest is $J^*([1]_{N \times K})$ where $[a]_{N \times K}$ denotes the all a matrix of dimensions N×K.

Before the recursion for $J^*(M, C)$ is written, the function $f(\cdot)$ where $\hat{\mathbb{M}} = f(\mathbb{M},C,k)$ is defined which implies that $$\hat{M}_{i,k} = M_{i,k} - M_{i,k}C_i \forall i \in \{1, \ldots, N\}.$$

$$\hat{M}_{i,j} = M_{i,j} \forall i \in \{1, \ldots, N\}, j \neq k.$$

This function describes the next state of the memory matrix given that Packet-k is served and the channel matrix is C in the current slot. Then, the following recursion can be written:

$$J^*(M, C) = \underset{k \in \{1,\ldots,K\}}{\operatorname{argmin}} \left\{ J^*\left(\int (M, C, k)\right) + 1_{\{M \neq \theta\}} \right\},$$

where $1_{\{A\}}$ is the indicator function of the event A.

The monotone nature of the f(•) function enables computation of J*(M, C) and π*(M, C) recursively starting from the base state J*(θ)=0. This DP formulation characterizes the optimal policy and its performance, and in theory it can be computed starting from a 1×1 matrix and increasing N and K successively. However, as N and K grows, the necessary number of operations grows exponentially and quickly becomes impossible to handle. Thus, an efficient heuristic policy is defined below and its performance simulated for comparison.

It can be observed in the above discussions that the optimal scheduling rule has a complicated structure. Yet, it is possible to find practical scheduling algorithms that will perform close to the optimal. Here, a heuristic policy which is believed to provide near optimal performance is proposed.

At any given time slot t, 1 the set of nodes with an ON channel (also called the set of active receivers) is denoted by $$\mathcal{A}[t] \triangleq \{i \in \{1, \ldots, N\} : C_i[t] = 1\}.$$

Under the symmetric conditions, the packet that would provide the most benefit should intuitively be transmitted over the channel. The benefit of a packet is measured in the number of nodes in A[t]* that has not yet received that packet. The underlying idea is to transfer the maximum number of useful packets over the channel at any given time. These remarks point to the heuristic algorithm given next.

---

HEURISTIC BROADCAST SCHEDULING (HBS):

If (t = 1)
  $M_{i,k}[t] \leftarrow 1$ for all $k \in \{1, \ldots, K\}, i \in \{1, \ldots, N\}$:

While $\left( \sum_{k=1}^{K} \sum_{i=1}^{N} M_{i,k}[t] > 0 \right)$ $K[t] \triangleq \{k \in \{1, \ldots, K\} : \exists i \in A[t] \text{ with } M_{i,k}[t] = 1\}$;
  If $(K[t] \neq \emptyset)$ $T[t] \triangleq \underset{k \in K[t]}{\operatorname{argmax}} \sum_{i \in A[t]} M_{i,k}[t]$;

Pick a $k^* \in T[t]$;
    $M_{i,k^*}[t] \leftarrow 0$ for all $i \in A[t]$;
    Transmit Packet-k* over the channel at slot t;
    $t \leftarrow t + 1$;

---

In the algorithm, each packet in K[t] has at least one receiver with an ON channel in slot t which demands that packet. HBS is the optimal scheduling strategy in the presence of CSI, when the channels to the receivers are identically distribute, i.e., that c_i=c for some common c.

Clearly, those packets that are not in K[t] should not be chosen for transmission. If K[t]≠θ then we define T[t] to be the set of packets in K[t] that yield the most benefit in slot t. Then, a packet from T[t] is picked for transmission in slot t. In the simulations, a random picking of one of the packets in T[t] is considered. However, the performance can be slightly improved by using more sophisticated methods. For example, for N=2, the packet picked from T[t] may be chosen amongst those packets that has already been received by the OFF receiver. Then, every time a receiver is ON, it will receive a useful packet until all its packets are complete. Thus, this algorithm gives the optimal policy for N=2. The generalization of the picking method to general K is complicated and requires increasing memory to operate. On the other hand, the complexity of HBS at each iteration of the loop is θ(KN) and requires no extra memory, and hence it is relatively easy to implement.

In this section, numerical computations and simulations to compare the performance of various schemes discussed so far are performed. A typical scenario is depicted in the graph 50 FIG. 2, where a file of size 30 packets is to be transmitted to a varying number of receivers, where each channel is ON or OFF equiprobably at every time slot.

Figure 2:
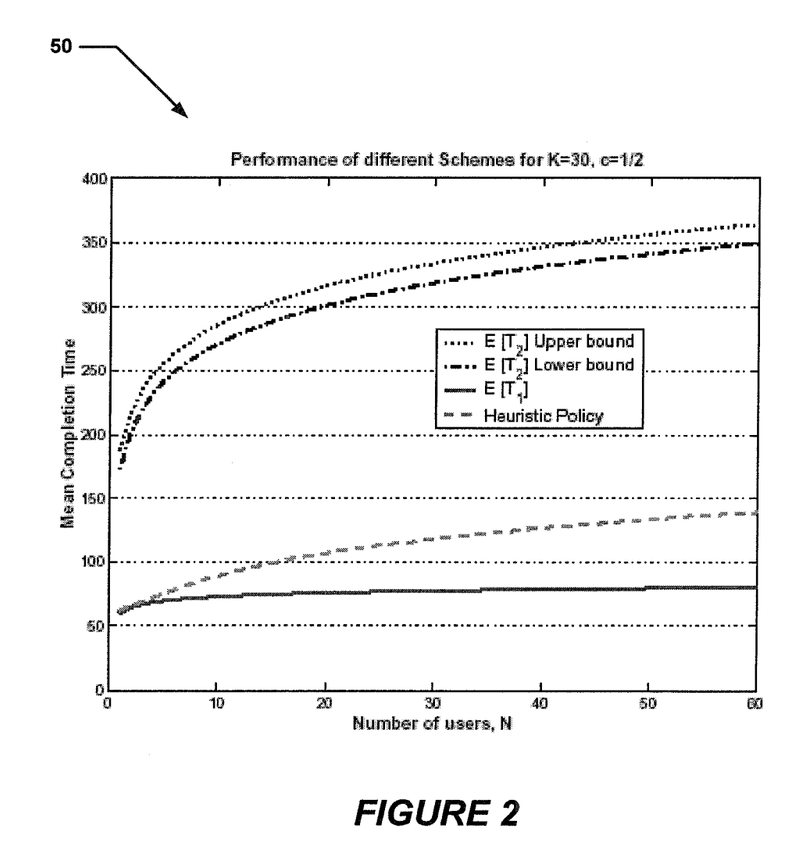
FIG. 2 comprises a graph showing the performance of two transmission strategies, namely network coding and scheduling, under the single file broadcast scenario.

The figure demonstrates the strength of the coding policy to the scheduling policy with and without CSI. It can be observed that as N increases the advantage of using coding improves.

In this section, it has been shown that either with or without CSI, coding provides a considerable gain in the mean delay to download a given file to multiple receivers over a time-varying medium. Moreover, its operation is significantly easier than the scheduling policy.

However, it requires an additional decoding operation at the receivers, which may or may not be critical depending of the file sizes and the computation capacity of the receivers.

In this section, the scenario where N receivers with symmetric channel conditions demand a unique files, i.e. F=N are considered. In this case, it is not clear whether coding will have the dominating behavior as it did in the broadcast scenario. Again, the availability of CSI is important. The scheduling case will be presented first, then the coding case.

Without CSI, the optimal scheduling is again Round Robin, except that it must be performed across files and across packets in each file. In particular, in the first round the first packet of each file is transmitted one after another, and in the next round the second packets are transmitted consecutively. When the end of a file is reached, move to the first packet and continue until all the packets of a file is received by its receiver. Only then is that file removed from the RR scheduler and the process continues with the remaining ones.

Scheduling with CSI will now be discussed. Here, the constraint is to serve at most one receiver at every time slot. The following known policy is introduced.

---

LONGEST CONNECTED QUEUE (LCQ):

$t \leftarrow 0$;
$Q_i \leftarrow K$, for all $i \in \{1, \ldots, N\}$;
Do
  $t \leftarrow t + 1$;

$t^*[t] \leftarrow \underset{1 \leq i \leq N}{\operatorname{argmax}} \{C_i[t]Q_i\}$;

if$(C_{t^*}[t] \neq 0)$
    Transmit $P_{i^*, Q_{i^*}}$;
    $Q_{i^*} \leftarrow \max(0, Q_{i^*} - 1)$;

While $\left( \sum_{i=1}^{N} Q_i > 0 \right)$;

Return t;              // Completion time

---

In the policy, $Q_i$ is used both as a pointer to the index of the next packet to be transmitted to Receiver-i, and also as the number of packets yet to be transmitted to Receiver-i. Thus, LCQ is a myopic policy that favors the receiver with the maximum number of packets to be received among all connected receivers.

Under symmetric channel conditions (i.e. $c_i=c$ For all i), LCQ minimizes the delay over all scheduling policies. In other words, $T^{LCQ} \leq_{st} T^\pi$.

where $T^{LCQ}$ denotes the completion time under the LCQ policy and $\pi$ is any other feasible scheduling policy, and $\leq_{st}$ is shorthand for "stochastically less than". This result is very strong and implies that $E[T^{LCQ}] \leq E[T^\pi]$ for any feasible scheduling policy $\pi$.

A set of coding classes is defined that partitions $\mathcal{F}$ (or equivalently N) into J subsets. Cj is used to denote the files (or equivalently receivers) in Class j. A restriction is set that only those files within the same class will be linearly coded with random coefficients as in RBC, while files of different classes will not be mixed. Notice that for each class, say Cj, this strategy effectively results in a single file of length $$K^j \triangleq \Sigma_{f \in C_j} K_f$$

that is demanded by $$b_j \triangleq |C_j|$$

distinct receivers. Hence, the multiple unicast problem is converted into a special case of multiple multicasts with each multicast having a disjoint set of receivers. Notice that the description of the strategy is yet incomplete, because it must be described how to "schedule" the transmissions of different classes.

Coding without CSI will now be discussed. In this case, it is assumed that each receiver informs the base station when it can decode its own file, which in turn implies that it can decode all the files within its class. The optimal policy is again going to be of the form of Round Robin over the coding classes. Considered is the case of $b_j=b$ and $K^j=K$ equal for all j. If J denotes the total number of coding classes, then only a combination from $C_j$ will be transmitted in slot (mJ+j) for m=0, 1, . . . until all the receivers get their files.

Notice that the analysis of the RR scheduler previously described does not directly apply to this case, because here once all the receivers of a class, say $C_j$, decode their file, then that class can be extracted from the round robin cycle. Nevertheless, similar analysis based on recursive formulations can be used for this setting. Without CSI the gain in grouping subsets of users as described above is only due to the decreasing size of the cycles as groups complete their receptions. If the period of each cycle were kept constant at its starting value of J throughout the operation, then grouping would have no effect on the average delay performance, because in such a scenario we would be comparing the expected number of slots before K ON channels are observed to 1/b times the expected number of slots before bK ON channels are observed.

Coding with CSI will now be discussed. In the presence of CSI, the optimal partitioning of the files $\{C_j\}$ is determined, as well as the optimal scheduling policy across these classes. The following proposition finds the optimal policy using stochastic coupling arguments.

Under the symmetric channel conditions (i.e. $c_i=c$ for all I$\in$N), the mean delay minimizing partitioning is obtained when bj=1 for all j, and the optimal policy is to implement LCQ.

Consider any given partitioning of the files, say $P=\{C_j\}_{j=1}^J$, and let $\pi p$ denote the optimal policy for this partitioning, which is not known in general. Also, let $T^{\pi p}$ be the random variable that denotes the completion time of all the files under the policy $\pi p$. In other words, $T^{\pi p}$ is the first slot when each receiver in Class-j received $K^j$ linear combinations of the packets from within their class, for all j. We use $\omega=(C[1], C[2], \ldots)$ to denote a sample path of the channel state process. Notice that the policy and $\omega$ determines $T^{\pi p}(\omega)$.

Next, a new policy $\tilde{\pi}$ defined which satisfies $T^{\tilde{\pi}}(\omega) \leq Y^{\pi p}(\omega)$ for all feasible $\omega$. For a given $\omega$, if $\pi p$ serves Class-j in slot t, then $\tilde{\pi}$ will send only the head-of-line packet of one of the connected receivers in the same class which received the minimum service so far. In other words, amongst the connected receivers in Class j, only the receiver that has the maximum number of remaining packets is served. Notice that this policy does not do any coding, and hence requires Receiver-f in Class-j to successfully receive $K_f$ packets of its file instead of $K^j$ packets as in $\pi p$.

To see that $T^{\tilde{\pi}}(\omega) \leq Y^{\pi p}(\omega)$, observe that whenever Class-j is served under $\pi p$, at most one packet (or one degree of freedom) can be received by each receiver in that class. Thus, before all of its receivers can decode their own packet, Class-j must be served at least $K^j$ times. But, with $\tilde{\pi}$ a single degree of freedom can be sent to one of the connected receivers in Class-j whenever that class is served under $\pi p$. Since for each f$\in C_j$, only $K_f$ degrees of freedom are required for Receiver-f with $\tilde{\pi}$, all the receivers complete their reception when Class-j is served $K^j = \Sigma_{f \in C_j} K_f$ times. These arguments prove that for any feasible sample paths the completion of the new policy is not larger than that of $\pi p$ for any partition P.

Figure 3:
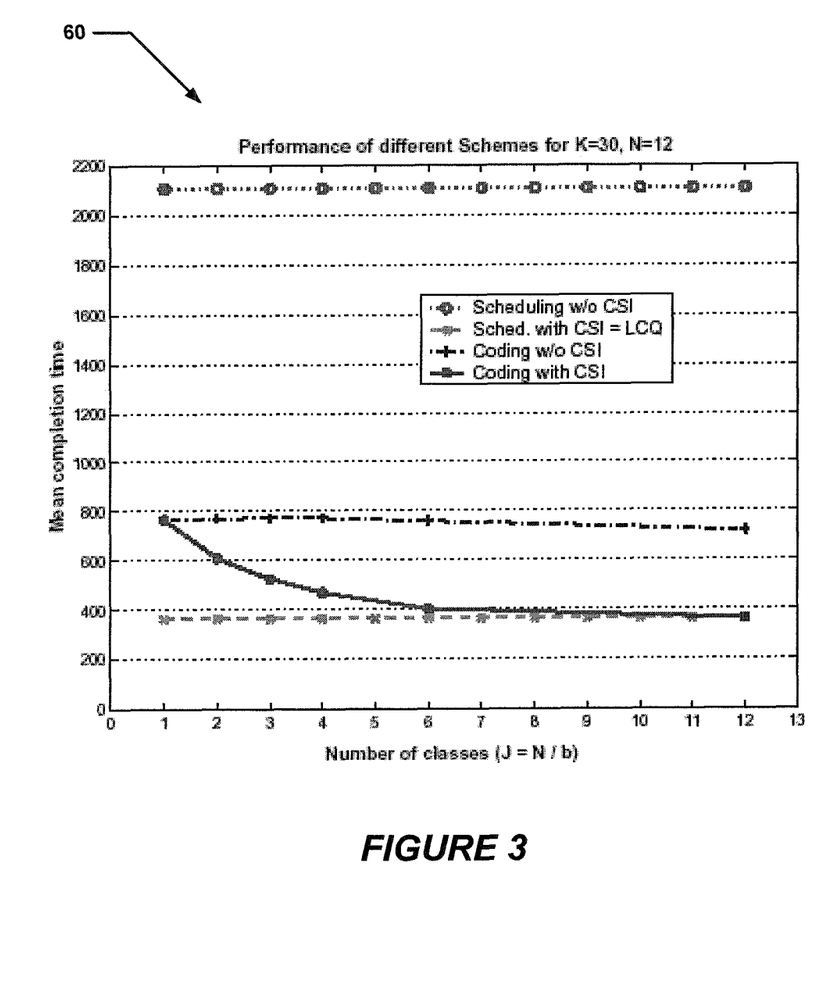
FIG. 3 comprises a graph showing mean completion time for different scheduling and coding arrangements for the multiple unicast file transmissions scenario.

In this section, the typical performance of various policies for reasonable parameters are compared. Let $b_j=b$ for all j and $K_f=K$ for all f$\in \mathcal{F}$. Moreover, let K=30 and N=F=12 and study the mean completion time behavior of the scheduling and coding strategies with and without CSI. Regarding the channel connectivity statistics, we assume that $c_i=1/2$ for all the channels. FIG. 3 depicts a graph 60 the simulation results of the policies discussed above for varying number of classes. In the figure, it can be observed that the performance of the LCQ scheduler serves as a lower bound as shown above. Since the optimal coding policy is not specified for an arbitrary b, in the simulation the following heuristic policy is used: at each time slot among the classes with the maximum number of connected receivers, the policy serves the class with the maximum degrees of freedom yet to be transmitted. This policy, when b=1 is the same as the LCQ policy. For this policy, it can be observed that the mean delay value achieved decreases to half its value when b is decreased from 12 to 1. It can also be observed that the performance of the coding without CSI improves as b decreases, but this decrease is rather insignificant.

Without CSI, the performance of scheduling is significantly worse than the coding solution. In this particular case, almost a threefold delay with scheduling is observed as opposed to coding. Given that the single-hop multiple unicast scenario does not improve the capacity of the channel, the presence of such a considerable delay gain is particularly striking.

The fact that both with and without CSI the performance of the coding strategy improves as b goes to one implies that for unicast transmissions, it is best to code within files, but not across them.

Under various scenarios, optimal policies have been derived and analytical expressions for the delay expressions. It can be observed that with easily implementable coding strategies, significant delay gains can be obtained.

Two scenarios have been discussed: the case when all receivers demand a single file (broadcast case), and the case when each receiver demands a different file (multiple unicast case). Under both scenarios, when the channel side information (CSI) is not available the advantage of using random coding strategies over pure scheduling approaches has been shown. However, when CSI is present, it turned out that coding gives considerable gains for the broadcast scenario, whereas scheduling is the best policy for the multiple unicast scenario under symmetric channel conditions. The assumption of perfect CSI is unrealistic for actual systems. Instead, if we assume the availability of CSI for a fraction of the time, then by using random coding, significant gains can still be achieved, whereas scheduling will be more vulnerable to the absence of CSI.

One rule of thumb obtained from our analysis was to code across packets within a file, but to avoid coding across files. This observation helps in finding the optimal policy for the general multiple multicast scenario.

Flow charts of the presently disclosed methods are depicted in FIGS. 4A-4B and 5A-5C. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4A:
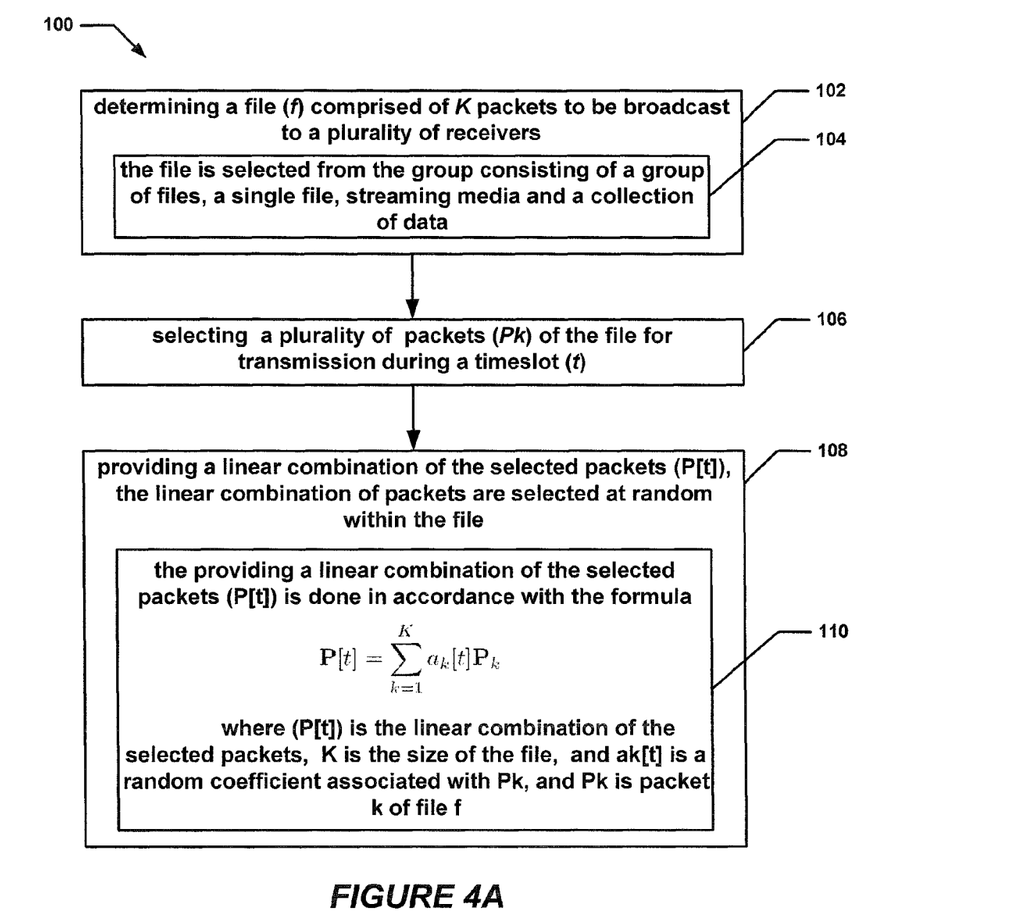
FIGS. 4A and 4B depict a flow diagram of a particular embodiment of a method of coding-based, delay-efficient data transmission for broadcasting a single file in accordance with embodiments of the invention.
Figure 4B:
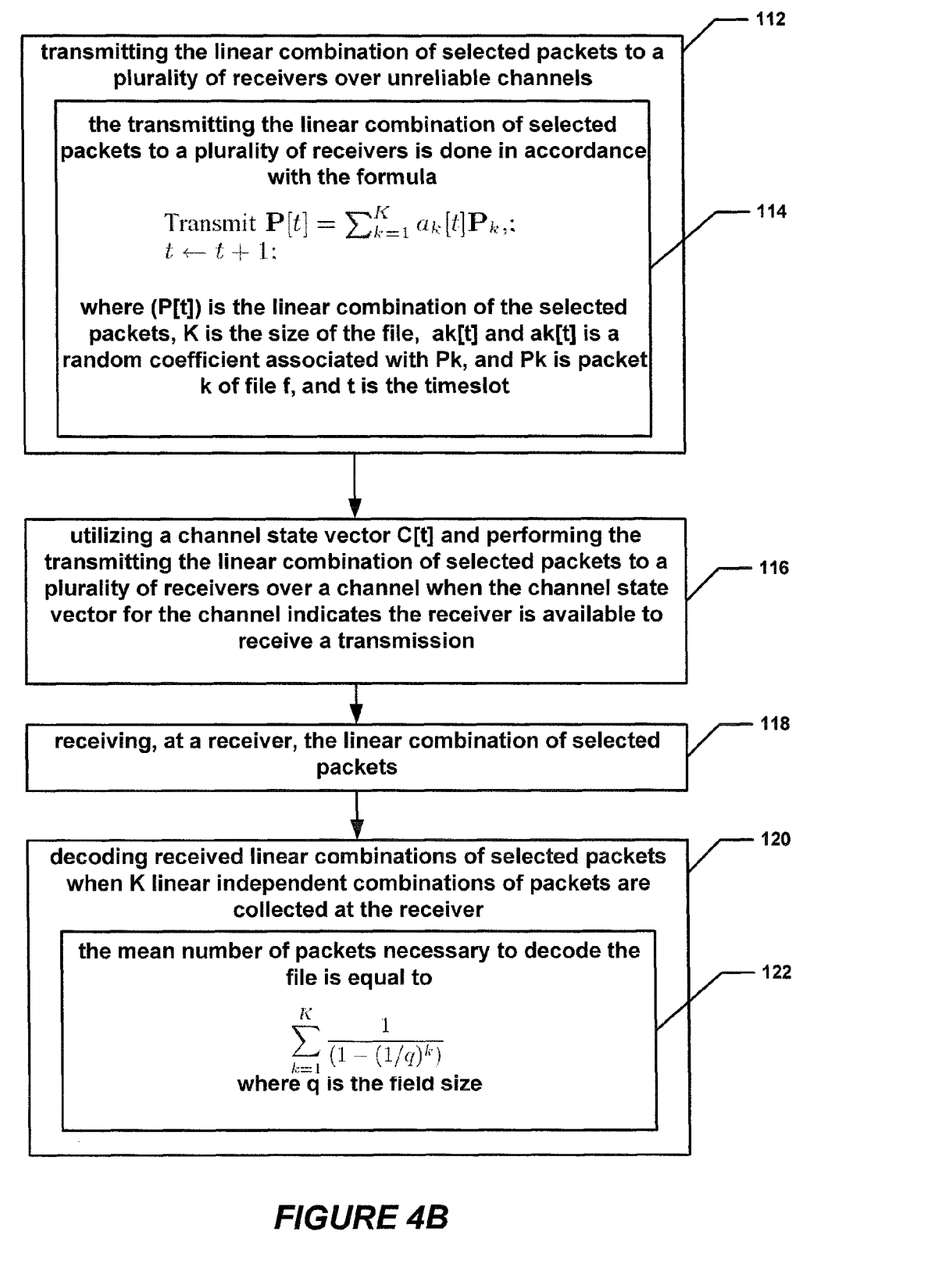

Referring now to FIGS. 4A-4B, a particular embodiment of a method 100 of coding-based, delay-efficient data transmission for broadcasting a single file is shown. The method 100 begins with processing block 102 which states determining a file (f) comprised of K packets to be broadcast to a plurality of receivers. As shown in processing block 104, the file is selected from the group consisting of a group of files, a single file, streaming media and a collection of data.

Processing block 106 discloses selecting a plurality of packets ($P_k$) of the file for transmission during a timeslot (t). Processing block 108 states providing a linear combination of the selected packets (P[t]), the linear combination of packets are selected at random within the file. This may include, as recited in processing block 110, wherein the providing a linear combination of the selected packets (P[t]) is done in accordance with the formula $$P[t] = \sum_{k=1}^{K} a_k[t] P_k$$

where (P[t]) is the linear combination of the selected packets, K is the size of the file, and $a_k[t]$ is a random coefficient associated with $P_k$, and $P_k$ is packet k of file f. Processing block 112 discloses transmitting the linear combination of selected packets to a plurality of receivers over unreliable channels. As shown in processing block 114 this may include herein the transmitting the linear combination of selected packets to a plurality of receivers is done in accordance with the formula $$\underset{t \leftarrow t+1;}{\text{Transmit}}\ P[t] = \sum_{k=1}^{K} a_k[t] P_k, ;$$

where (P[t]) is the linear combination of the selected packets, K is the size of the file, $a_k[t]$ and $a_k[t]$ is a random coefficient associated with $P_k$, and $P_k$ is packet k of file f, and t is the timeslot.

Processing block 116 discloses utilizing a channel state vector C[t] and performing the transmitting the linear combination of selected packets to a plurality of receivers over a channel when the channel state vector for the channel indicates the receiver is available to receive a transmission.

Processing continues with processing block 118 which states receiving, at a receiver, the linear combination of selected packets. Processing block 120 recites decoding received linear combinations of selected packets when K linear independent combinations of packets are collected at the receiver. Processing block 122 discloses the mean number of packets necessary to decode the file is equal to $$\sum_{k=1}^{K} \frac{1}{\left(1 - \left(\frac{1}{q}\right)^k\right)}$$

where q is the field size.

Figure 5A:
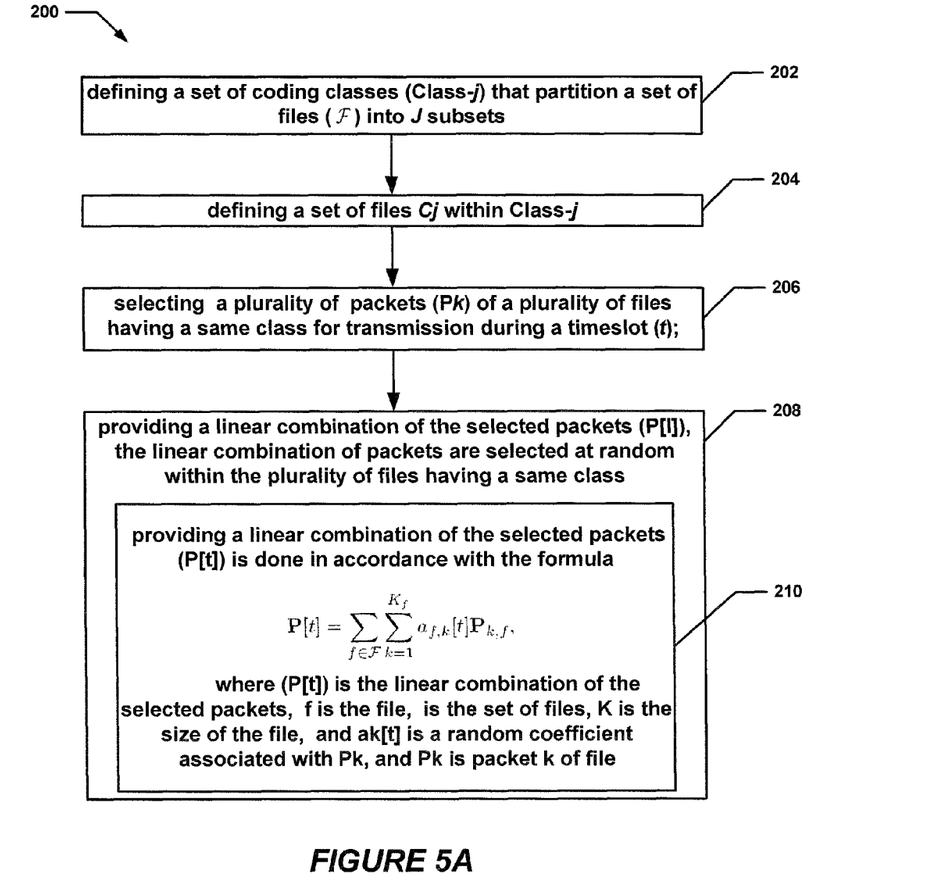
FIGS. 5A-5C depict a flow diagram of a particular embodiment of a method of coding-based, delay-efficient data transmission for multiple unicast transmissions in accordance with embodiments of the invention.
Figure 5B:
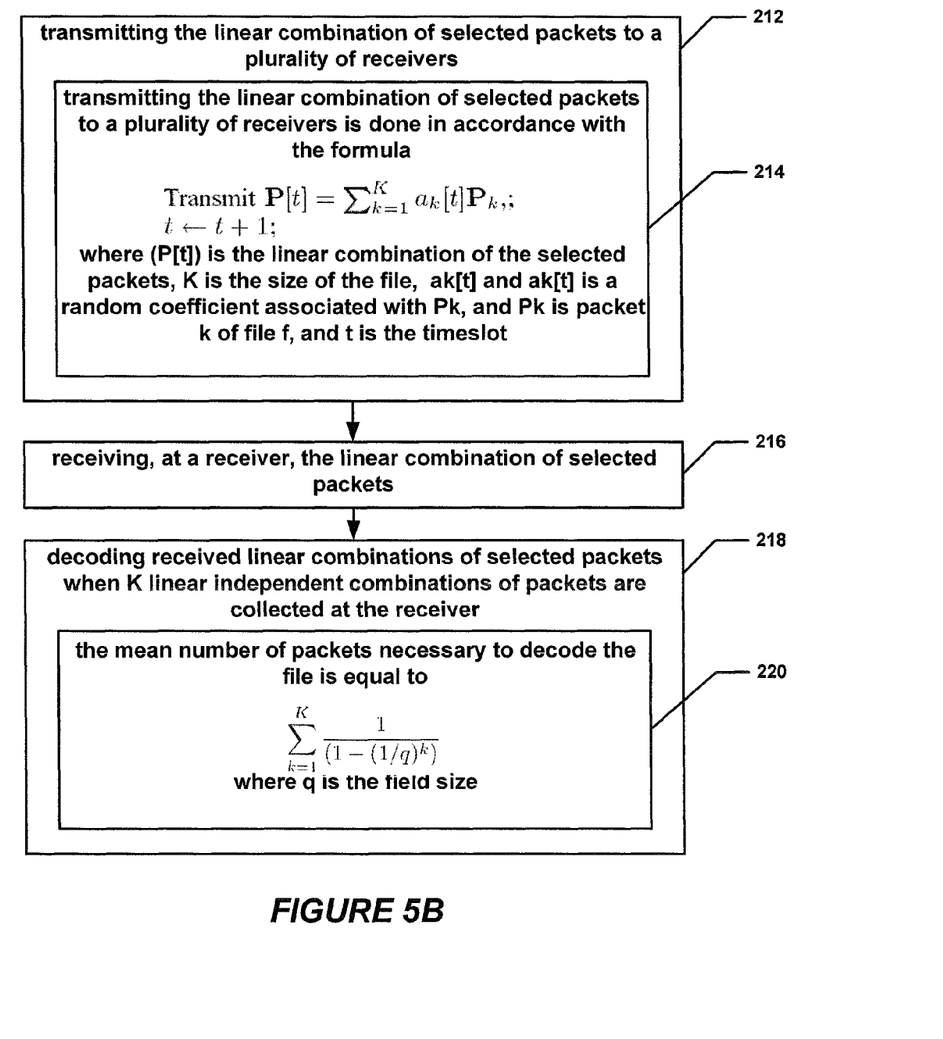
Figure 5C:
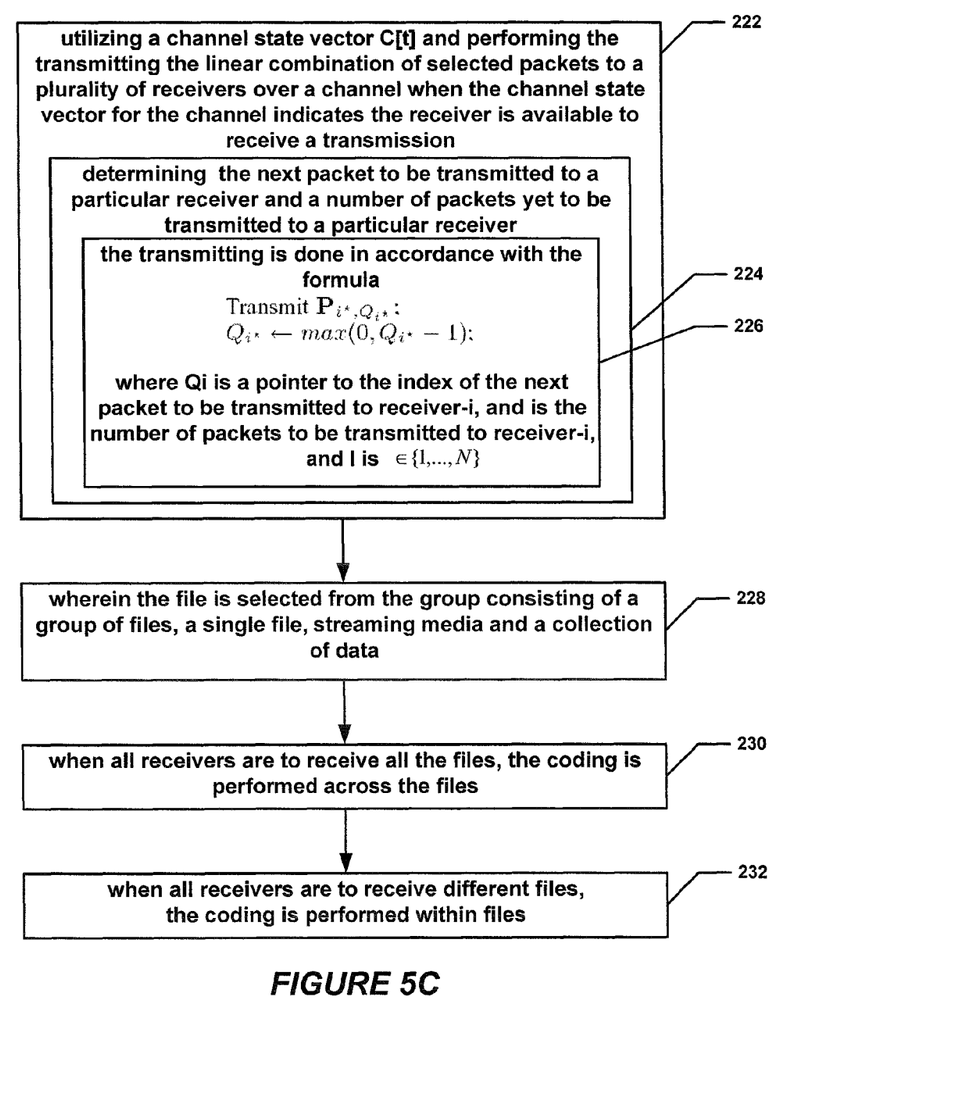

Referring now to FIGS. 5A-5C, a particular embodiment of a method 200 of coding-based, delay-efficient data transmission for multiple unicast transmissions is shown. The method 200 begins with processing block 202 which discloses defining a set of coding classes (Class j) that partition a set of files ($\mathcal{F}$) into J subsets.

Processing block 204 states defining a set of files $c_j$ within Class j. Processing block 206 recites selecting a plurality of packets ($P_k$) of a plurality of files having a same class for transmission during a timeslot (t).

Processing block 208 discloses providing a linear combination of the selected packets (P[t]), the linear combination of packets are selected at random within the plurality of files having a same class. This may include, as shown in processing block 210 wherein the providing a linear combination of the selected packets (P[t]) is done in accordance with the formula $$P[t] = \sum_{f \in \mathcal{F}} \sum_{k=1}^{K_f} a_{f,k}[t] P_{k,f},$$

where (P[t]) is the linear combination of the selected packets, f is the file, $\mathcal{F}$ is the set of files, K is the size of the file, and $a_k[t]$ is a random coefficient associated with $P_k$, and $P_k$ is packet k of file f.

Processing block 212 states transmitting the linear combination of selected packets to a plurality of receivers. This may include, as shown in processing block 214 wherein the transmitting the linear combination of selected packets to a plurality of receivers is done in accordance with the formula $$\text{Transmit}_{t \leftarrow t+1;} P[t] = \sum_{k=1}^{K} a_k[t]P_k,;$$

where (P[t]) is the linear combination of the selected packets, K is the size of the file, $a_k[t]$ and $a_k[t]$ is a random coefficient associated with $P_k$, and $P_k$ is packet k of file f, and t is the timeslot.

Processing continues with processing block 216 which recites receiving, at a receiver, the linear combination of selected packets. Processing block 218 discloses decoding received linear combinations of selected packets when K linear independent combinations of packets are collected at the receiver. Processing block 220 states wherein the mean number of packets necessary to decode the file is equal to is equal to $$\sum_{k=1}^{K} \frac{1}{\left(1 - \left(\frac{1}{q}\right)^k\right)}$$

where q is the field size.

Processing block 222 recites utilizing a channel state vector C[t] and performing the transmitting the linear combination of selected packets to a plurality of receivers over a channel when the channel state vector for the channel indicates the receiver is available to receive a transmission. Processing block 224 discloses wherein the performing the transmitting includes determining the next packet to be transmitted to a particular receiver and a number of packets yet to be transmitted to a particular receiver.

Processing block 226 states wherein the transmitting is done in accordance with the formula Transmit $P_{i^*,Q_{i^*}}$:

$Q_i^* \leftarrow \max(0, Q_{i^*}-1)$:

where $Q_i$ is a pointer to the index of the next packet to be transmitted to receiver-i, and is the number of packets to be transmitted to receiver-i, and I is $\in \{1, \ldots, N\}$.

Processing block 228 recites wherein the file is selected from the group consisting of a group of files, a single file, streaming media and a collection of data. Processing block 230 discloses wherein when all receivers are to receive all the files, the coding is performed across the files. Processing block 232 states wherein when all receivers are to receive different files, the coding is performed within files.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A method of coding-based, delay-efficient data transmission for broadcasting a single file, the method comprising;
   determining a complete pre-existing file (f) comprised of K packets to be broadcast to a plurality of receivers;
   selecting a plurality of packets ($P_k$) of said file for transmission during a timeslot (t);
   providing a linear combination of said selected packets (P[t]), said linear combination of packets are selected at random within said file wherein said providing a linear combination of said selected packets (P[t]) is done in accordance with the formula $$P[t] = \sum_{k=1}^{K} a_k[t]P_k$$

where (P[t]) is the linear combination of said selected packets, K is the size of the file, and $a_k[t]$ is a random coefficient associated with $P_k$, and $P_k$ is packet k of file f;
   transmitting said linear combination of selected packets to a plurality of receivers over unreliable channels;
   receiving, at a receiver, said linear combination of selected packets;
   decoding received linear combinations of selected packets when K linear independent combinations of packets are collected at said receiver; and
   wherein the mean number of packets necessary to decode the file is equal to $$\sum_{k=1}^{K} \frac{1}{(1-(1/q)^k)}$$

where q is the field size.

2. The method of claim 1 wherein said transmitting said linear combination of selected packets to a plurality of receivers is done in accordance with the formula $$\text{Transmit } P[t] = \sum_{k=1}^{K} a_k[t]P_k,;$$

$t \leftarrow t+1;$ where (P[t]) is the linear combination of said selected packets, K is the size of the file, $a_k[t]$ and $a_k[t]$ is a random coefficient associated with $P_k$, and $P_k$ is packet k of file f, and t is the timeslot.

3. The method of claim 1 further comprising utilizing a channel state vector C[t] and performing said transmitting said linear combination of selected packets to a plurality of receivers over a channel when the channel state vector for said channel indicates said receiver is available to receive a transmission.

4. The method of claim 1 wherein said file is selected from the group consisting of a group of files, a single file, streaming media and a collection of data.

5. The method of claim 1 wherein said linear combinations of selected packets are received and are decoded when K linearly independent combinations of packets are collected.

6. A method of coding-based, delay-efficient data transmission for multiple unicast transmissions, the method comprising:

defining a set of coding classes (Class j) that partition a set of files ($\mathcal{F}$) into J subsets;
defining a set of complete, pre-existing files $C_j$ within Class j;
selecting a plurality of packets ($P_k$) of a plurality of files having a same class for transmission during a timeslot (t);
providing a linear combination of said selected packets (P[t]), said linear combination of packets are selected at random within said plurality of files having a same class, wherein said providing a linear combination of said selected packets (P[t]) is done in accordance with the formula $$P[t] = \sum_{f \in \mathcal{F}} \sum_{k=1}^{K_f} a_{f,k}[t] P_{k,f},$$

where (P[t]) is the linear combination of said selected packets, f is the file, $\mathcal{F}$ is the set of files, K is the size of the file, and $a_k[t]$ is a random coefficient associated with $P_k$, and $P_k$ is packet k of file; and
transmitting said linear combination of selected packets to a plurality of receivers;
receiving, at a receiver, said linear combination of selected packets;
decoding received linear combinations of selected packets when K linear independent combinations of packets are collected at said receiver; and
wherein the mean number of packets necessary to decode the file is equal to $$\sum_{k=1}^{K} \frac{1}{\left(1 - \left(\frac{1}{q}\right)^k\right)}$$

wherein q is the field size.

7. The method of claim 6 wherein said transmitting said linear combination of selected packets to a plurality of receivers is done in accordance with the formula $$\text{Transmit } P[t] = \sum_{k=1}^{K} a_k[t] P_k ;$$

$$t \leftarrow t + 1;$$

where (P[t]) is the linear combination of said selected packets, K is the size of the file, $a_k[t]$ and $a_k[t]$ is a random coefficient associated with $P_k$, and $P_k$ is packet k of file f, and t is the timeslot.

8. The method of claim 7 wherein when all receivers are to receive different files, said coding is performed within files.

9. The method of claim 6 further comprising utilizing a channel state vector C[t] and performing said transmitting said linear combination of selected packets to a plurality of receivers over a channel when the channel state vector for said channel indicates said receiver is available to receive a transmission.

10. The method of claim 9 wherein said performing said transmitting includes determining the next packet to be transmitted to a particular receiver and a number of packets yet to be transmitted to a particular receiver.

11. The method of claim 10 wherein said transmitting is done in accordance with the formula $$\text{Transmit } P_{i^*}, Q_{i^*};$$

$$Q_{i^*} \leftarrow \max(0, Q_{i^*} - 1);$$

where $Q_i$ is a pointer to the index of the next packet to be transmitted to receiver-i, and is the number of packets to be transmitted to receiver-i, and l is $$\in \{1, \ldots, N\}.$$

12. The method of claim 6 wherein said file is selected from the group consisting of a group of files, a single file, streaming media and a collection of data.

13. The method of claim 6 wherein when all receivers are to receive all the files, said coding is performed across the files.

14. The method of claim 6 wherein said linear combinations of selected packets are received and are decoded when K linearly independent combinations of packets are collected.

\* \* \* \* \*